United States Patent
Rab

[15] 3,645,434
[45] Feb. 29, 1972

[54] FILM CASSETTE
[72] Inventor: Harry Rab, Fairport, N.Y.
[73] Assignee: The Singer Company
[22] Filed: Apr. 27, 1970
[21] Appl. No.: 32,012

[52] U.S. Cl. .................226/196, 206/46 FM, 206/52 F, 242/71.1
[51] Int. Cl. ................................................B65d 85/67
[58] Field of Search..............206/62, 59, 59 E, 59 F, 46 FM, 206/52 F; 95/19; 250/68; 242/71.1; 226/118, 196

[56] References Cited

UNITED STATES PATENTS

| | | | |
|---|---|---|---|
| 1,694,401 | 12/1928 | Slocum | 242/71.1 |
| 1,930,335 | 10/1933 | Bornmann | 206/52 F |
| 3,341,146 | 9/1967 | Fairbanks | 242/71.1 |
| 3,288,389 | 11/1966 | Gersch | 242/71.1 |

Primary Examiner—Richard A. Schacher
Attorney—George W. Killian, Patrick J. Schlesinger, Charles R. Lepchinsky and Jay M. Cantor

[57] ABSTRACT

There is disclosed a substantially lighttight film cassette into which a length of exposed photographic medium may be incrementally inserted through a slot. A pliable guide medium having a low coefficient of friction, a width not exceeding that of the film cassette, and a length of the order of the cross-sectional perimeter of the film cassette is attached to the film cassette for guiding and expediting the insertion of the exposed photographic medium. The medium is inserted into the cassette by external advancing means which advance the medium in controlled increments.

8 Claims, 2 Drawing Figures

PATENTED FEB 29 1972 3,645,434

INVENTOR.
HARRY RAB
BY
George W. Killian
AGENT

FILM CASSETTE

BACKGROUND OF THE INVENTION

The invention finds particular utility in an application wherein an indeterminate length of a flexible photographic medium is withdrawn from a supply source, exposed in an appropriate manner, and inserted into a lighttight cassette for subsequent transportation of the exposed photographic medium to a darkroom where the photographic medium is removed from the cassette and developed in a well-known manner.

SUMMARY OF THE INVENTION

The invention finds particular utility in an application wherein the length of the photographic medium that is employed and inserted into the cassette is of a variable length. That is, it may be used in a machine wherein, in a first situation, a given length of the photographic medium may be used and wherein, in a subsequent use of the machine, 10 times the given length of photographic medium may be required. A typical application might include the taking of identification-type photographs with the photographic medium advanced an appropriate amount, after the taking of each photograph, so that the exposed medium is inserted into the cassette. When it is convenient, the photographic medium could be cut and the cassette removed and transported, together with its contents, to the darkroom for photographic processing of the photographic medium. In another application, the invention might be used in connection with a phototypesetter wherein the text is exposed onto the photographic medium in a well-known manner and after all of the desired text has been photographed character-by-character or line-by-line onto the photographic medium, the photographic medium may be cut and the cassette containing the exposed photographic medium taken to the darkroom for the usual processing.

Other types of applications will readily occur to those who have the necessary training and experience.

Although the present invention is described in terms of a cassette into which a length of photographic medium is inserted, it will be obvious that the cassette might also be used for the insertion and temporary storage of any medium which has the necessary characteristics of flexibility and stiffness.

There are numerous techniques in the prior art which disclose the removal of a flexible medium from a supply reel and the storage of the material so removed in some convenient manner. For example, in the ubiquitous typewriter the typewriter ribbon is removed from a supply reel and wound on a takeup reel. And in most cameras, the film is unwound from a supply reel and wound on a takeup reel. In a similar manner, magnetic tape is removed from a supply reel and wound on a takeup reel. In some situations the medium withdrawn from the supply reel is stuffed into some type of container. In such situations, the container is usually quite large and the material is allowed to dispose itself in the container in a random fashion. Such methods, although entirely satisfactory for certain types of applications, have the disadvantages of requiring a relatively large receiving container, and of the possibility of damaging the film or tape inserted therein by allowing a crease or kink to form. Disadvantages of a takeup reel are that it is necessary to attach the leading end of the material being removed from the supply reel to the takeup reel, and means must be provided to rotate the takeup reel. The use of a power driven takeup reel has the advantage that the medium is pulled from the supply reel and wound onto the takeup reel. However, with this system it requires a rather sophisticated mechanical structure to advance the medium in precise increments.

The present invention discloses a means for withdrawing a flexible medium from a supply source. In the normal situation the flexible medium will have been wound about a cylindrical hub and therefore the medium will be predisposed to arrange itself in a spiral fashion when it is withdrawn from the source and inserted into a suitable container. The container, or cassette, of the present invention comprises an enclosure having suitable dimensions and includes a slot through which the medium is inserted. The natural curl of the material will tend to encourage the material to position itself in a spiral form within the cassette. However, the leading edge of the material could easily catch in one corner and thereby prevent the formation of the spiral, or coil, and/or cause buckling of the material as additional material is incrementally inserted through the slot. In addition the weight of the material and the friction thereof against the internal surfaces of the cassette could produce such a resistance to the insertion of additional material that buckling would result. To minimize the effect of these detrimental tendencies a permanently associated pliable guide is included within the cassette and has one end positioned near the slot so that the photographic medium inserted through the slot is guided by the permanently associated pliable guide. The flexible guide is preferably made of a material such as the material sold under the trade name "Teflon" and which has a low coefficient of friction. Accordingly, as the photographic medium is inserted into the cassette through the slot, it is guided by the permanently pliable or flexible medium and thereby the inserted medium encounters a minimum frictional resistance thereby allowing the insertion of a greater length of the photographic medium.

From the foregoing brief description, it will be apparent that an object of the invention is to provide a new and improved film cassette.

It is a more specific object of the invention to provide a new and improved cassette into which a medium may be incrementally inserted.

It is another object of the invention to provide a cassette having an internal guide means for guiding a medium as it is inserted and for encouraging the inserted medium to assume a spiral form.

It is another object of the invention to provide a cassette into which a medium may be incrementally inserted while encountering a minimum frictional resistance.

It is another object of this invention to provide a cassette having the foregoing enumerated advantages and into which a greater length of medium may be incrementally inserted than was possible with prior art cassettes.

Other objects and advantages of the invention will be apparent as the following description proceeds and the characteristics which comprise the novel aspects of the invention will be defined in the claims annexed to and forming a part of this specification. The invention will be best understood when considered in connection with the following description taken together with the accompanying drawing which discloses the principles of the invention and a preferred means for carrying it out.

DESCRIPTION OF THE PREFERRED EMBODIMENT

Figure 1:
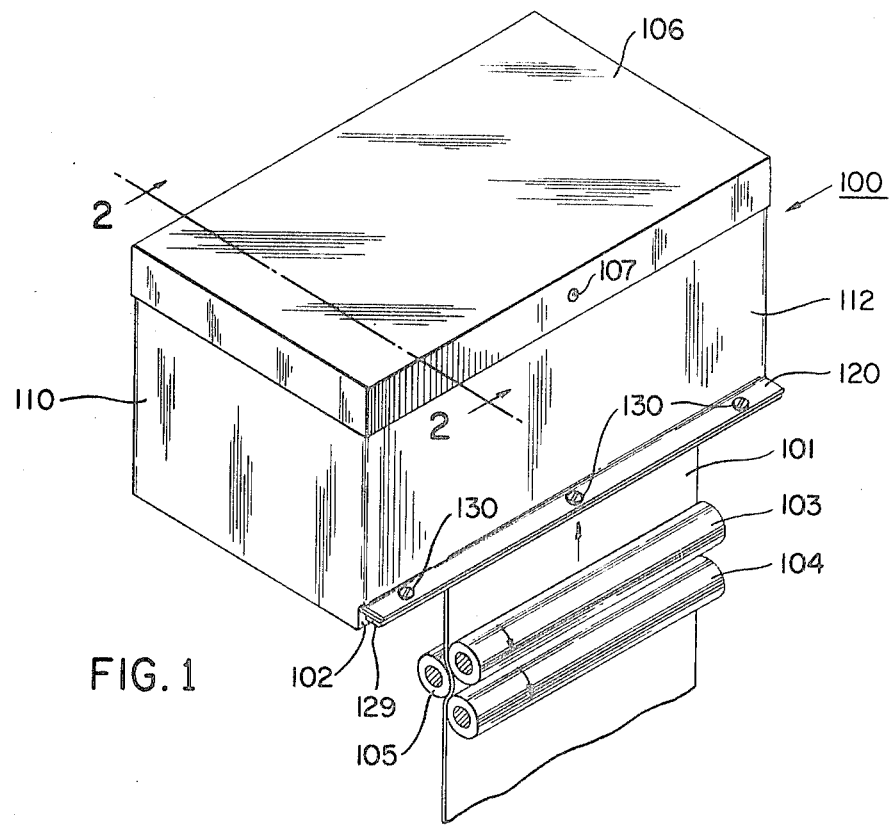
FIG. 1 is a perspective view of the cassette together with a typical set of roller means for incrementally inserting a flexible medium such as a photographic medium into the cassette and FIG. 2 is a cross-sectional view of FIG. 1 taken along the line 2—2 of FIG. 1 and showing the pliable guiding medium associated with the cassette. As is customary, a given element is identified with the same reference number in all views.

Referring now more specifically to FIG. 1 of the drawing, there is shown therein a perspective view of a cassette 100 which is adapted to receive a length of photographic medium 101. It should be understood that the cassette 100 might also be used to accept any type of suitable member other than a photographic medium 101. Accordingly, it should be understood that although this specification will refer to a photographic medium 101 that any other type of element having equivalent properties of flexibility and stiffness may be inserted into the cassette 100. The photographic medium 101 is inserted into the cassette 100 through an entry slot 102 (more clearly seen in FIG. 2). The medium 101 may have a width of any convenient value up to that of the internal width of the cassette 100. The width is normally at least as wide as that of the medium 101. The medium 101 is inserted into the cassette 100 through entry slot 102 by an incremental frictional drive comprising rollers 103, 104 and 105. In the illustrated application, the rollers 103, 104 and 105 have their respective centerlines at the vertices of an isosceles triangle. More specifically rollers 103 and 104 are not allowed to contact each other as they rotate in the same direction. When the photographic medium 101 has been inserted between the rollers 103, 104 and 105 in the manner shown in FIG. 1, the photographic medium 101 will be firmly held by a pinching action between rollers 105 and 103 and also between 105 and 104. To facilitate the insertion of the medium 101 between the rollers 103, 104 and 105 means (not shown) may be provided to move the rollers 103, 104 and/or 105 relative to each other. After insertion of the medium 101 and restoration of the rollers 103, 104 and 105 to their operative positions if one or more of the rollers 103 and 104 is rotated in the direction indicated by the arrow on these rollers, the photographic medium 101 will be advanced in an upward direction as viewed in FIG. 1. Alternatively or additionally, the roller 105 may be power driven about its axis in a direction opposite to that shown by the arrow on rollers 103 and 104 to implement an advance of the photographic medium 101 toward the cassette 100. Obviously alternate means might be used to advance the photographic medium 101 for inserting lengths thereof in the cassette 100. For example, a photographic medium 101 might be used which has sprocket holes (not shown) near its outer edges which would engage an appropriate set of sprocket wheels (not shown). Although such technique would serve the function, it suffers from the disadvantage of requiring a specially prepared photographic medium 101 and limits the width of the photographic medium 101 which may be used and/or requires means for accurately adjusting the spaced-apart distance of the sprocket gears for driving the photographic medium 101. Other types of drive means might also be used, for example, pinch rollers which grasp the outer edges of the medium 101. Other techniques which may be implemented according to the requirements of the particular application will readily occur to those who may be interested in using the cassette 100 of the present invention.

Figure 2:
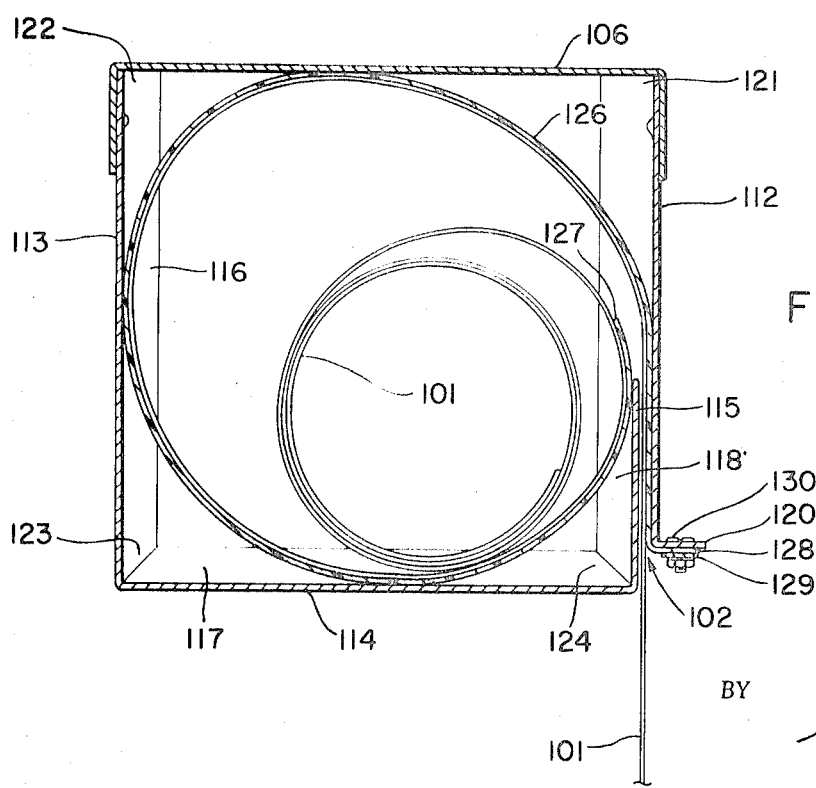

The cassette 100 has a lid 106 which fits the cassette 100 tight enough to make a satisfactory light seal but loose enough that it may be readily removed in order to have access to the length of photographic medium 101 inserted into the cassette 100. Dimple 107 on the lid 106 serves to help hole the lid 106 securely to the cassette 100. When the cassette 100 is used for the storage of an unexposed photographic medium 101, the cassette 100 would normally have an overall flat black finish to eliminate or minimize the possibility of any light reflection. The cassette 100 comprises end 110 and an opposite end 111 as seen in FIGS. 1 and 2, respectively. The cassette 100 also has a front portion 112 and a rear portion 113 as well as a bottom 114. As may be readily envisioned, the main part of the cassette 100 may be made from two pieces of sheet metal cut and formed in an appropriate manner. More specifically, the ends 110 and 111 together with the front 112 would comprise one of the parts while the back 113 and bottom 114 would comprise the other part. In addition, it should be observed that the second-named part also includes an upstanding face 115 which taken together with the front 112 forms the entry slot 102 into which the photographic medium 101 may be inserted. Furthermore, the part including the back 113 and bottom 114 also has flanges 116, 117 and 118 which may be fastened to the end walls 110 and 111 by any appropriate means, such as, spot welding, braising, or soldering. It should be obvious that the cassette 100 could be formed by any other convenient and appropriate assembly of sheet metal parts. Furthermore, if desired, the cassette 100 could have a cross-sectional geometry which is other than square or rectangular. For example, the cassette 100 could have a circular cross section or any other shaped cross section which is convenient for the application under consideration. It is desirable that the interior of the cassette 100 be fashioned in a manner to minimize any rough surfaces, obstructions, projections, or elements which would interfere with the insertion of the photographic medium 101.

As will be seen in FIGS. 1 and 2, the front face 112 has a portion thereof bent over to form a lip 120 which provides a function to be described more fully hereinafter.

If an attempt were made to insert a photographic medium 101 into the cassette 100 as thus far described, it is believed that it is fairly obvious that there would be a tendency for the leading edge of the photographic medium 101 to catch in one or more of the corners 121, 122, 123, and 124 and thereby cause a buckling of the photographic medium 101 and quite possibly a damage to the medium 101. Although a round cross-sectional geometry of the cassette 100 might somewhat reduce the tendency for the photographic medium 101 to be caught in corners, it is believed that such shape would not entirely eliminate problems and in addition such shape would be more expensive to manufacture. For example with a round cross section the area of contact between the interior surfaces of the cassette 100 and the photographic medium 101 would be increased thereby providing a greater frictional area and thus a greater force would be required to insert the photographic medium 101. This would increase the tendency for the photographic medium 101 to buckle at some point on the cassette side of the rollers 103, 104 and 105. To overcome the cited difficulties, prior art cassettes have attempted to utilize a plurality of light flexible metalic guide fingers within the interior of the cassette 100. Such guide fingers have served a function but have not been entirely satisfactory because they might be easily bent during the removal of the photographic medium in the darkroom. Accordingly, there is disclosed herein a new and improved pliable guide means for guiding the photographic medium 101 as it is inserted into the cassette 100 and which is not likely to be damaged during handling of the cassette 100 in the photographic darkroom.

In order to guide the collection of the photographic medium 101 within the cassette 100, there is provided a guide member 126 which comprises a relatively thin sheet of a pliable or flexible medium which has a low coefficient of friction and which has a width which may be anything up to the width of the cassette 100, and a length which is of the order of the cross-sectional perimeter of the cassette 100. Furthermore, the guide member is chosen from a group of materials which has a low coefficient of friction. A material sold under the trade name "Teflon" has suitable characteristics. If the material selected for use as the guide member 126 has a grain, the grain should be arranged in the direction of motion of the photographic medium 101. That is, the grain of the guide member 166 should be parallel to the length of the guide member 126. As already stated, the length of the guide member 126 is approximately equal to the cross-sectional perimeter of the cassette 100. As will be seen, the guide member 126 is secured at only one end and has a loose end 127. The secured end 128 is secured to lip 120 by means of a clamping plate 129 and a plurality of fasteners 130. From the secured end 129 of the guide member 126, the guide member 126 passes through slot 102 and is loosely disposed within the interior of cassette 100. Although the guide member 126 is pliable or flexible, it is not limp and it will tend to dispose itself within the interior of the cassette 100 somewhat in the manner shown in FIG. 2.

By a simple means not shown, the rollers 103, 104 and 105 may be moved apart in order to permit the placement of the photographic medium 101 therebetween. The cassette 100 is supported by any suitable means (not shown) which maintains the slot 102 of cassette 100 parallel to and slightly above the line where the photographic medium 101 leaves contact with rollers 103 and 105. In normal operation, the leading end of the photographic medium 101 would be manually inserted into the slot 102. Thereafter, the entire chamber (not shown)

which contains the cassette 100, the rollers 103, 104 and 105, the photographic medium 101, and the supply of the photographic medium 101 will be closed to exclude the entry of any light. Thereafter, one or more of the rollers 103, 104 and 105 will be power driven in an appropriate direction to insert some of the photographic medium 101 through the slot 102 into the cassette 100. A sufficient length of the photographic medium is so transported into the cassette 100 as to assure that an unexposed portion of the photographic medium 101 has been placed in an appropriate position for controlled exposure. Such appropriate position will normally be at some point below the roller 104 where the photographic medium 101 is held by means not shown in the desired plane to provide the sharpest image on the medium 101. Subsequent to the exposure of the last image which it is desired to have placed on the photographic medium 101, one or more of the rollers 103, 104 and 105 will be power driven to insert at least all of the exposed portion of the medium 101 into the cassette 100. In addition, it is obvious that one or more of the rollers 103, 104 and 105 will be incrementally and periodically rotated, as may be required, to provide unexposed photographic medium 101 at the position where the image to be recorded is to be optically produced. When all of the exposed medium 101 has been inserted into the cassette 100, the chamber containing the cassette 100 and the supply of photographic medium 101 is opened and, by any convenient means, the photographic medium 101 is cut to separate the supply thereof from that which has been inserted into the cassette 100. Normally such cut would be made between the roller 103 and the entry slot 102. After the medium 101 has been cut, the entire cassette may be removed from the chamber in which it had been contained and the cassette 100 together with the exposed photographic medium 101 transported to the darkroom where the medium 101 contained therein may be removed after opening the cassette 100, by removal of the top 106 from the cassette 100. Thereafter the photographic medium 101 may be developed in the well-known manner. If desired, immediately after the removal of the cassette 100 a second cassette 100 could be placed in the appropriate position within the chamber and the process previously described be repeated.

As may be seen in FIG. 2, the entry of the medium 101 through the slot 102 into the cassette 100 causes the medium 101 to be in contact with a portion of the guide number 126 and the upstanding face 115 of the cassette 100. If desired, a piece of material similar to that used for the guide member 126 could be placed on the entry slot side of upstanding face 115 so that entering medium 101 does not contact anything but material similar to that of guide member 126 which has a very low coefficient of friction. As the medium 101 enters the cassette 100 through the slot 102, it will be guided by guide member 126 away from each of the corners 121, 122, 123 and 124. In the normal application, the supply of photographic medium 101 will be wound on a supply spool and therefore, there will be a natural tendency for the photographic medium 101 to dispose itself in a spiral configuration. The photographic medium 101 used and the direction which it faces should be so selected that the medium 101 will naturally tend to dispose itself in a spiral fashion a shown in FIG. 2. This would normally mean that the emulsion side of the medium 101 would face the centerline of the spiral formed by the medium 101. It should be understood that it is not necessarily required that the natural diameter of the spiral formed by the medium 101 be less than the distance between the front and rear faces 112 and 113 of the cassette 100.

The low coefficient of friction between the medium 101 and the guide member 126 will permit the easy insertion of the member 101 into the cassette 100 without the use of excessive force and thereby greatly reduce the tendency of the medium 101 to buckle either inside or outside of the cassette 100. It is recommended that the medium 101 be inserted into the cassette from the bottom as illustrated in FIG. 2 as it is believed that this geometry will cause the least interference with the insertion of the medium 102 and thereby permit the insertion of a greater total length of the medium 101. Experience has shown that many more feet of the medium 101 may be satisfactorily inserted into the cassette 100 than would be required in a typical application.

In the event that through mishandling or accident the guide member 126 should be damaged, it is obvious that it may be replaced by the removal of fasteners 130 and clamping plate 129 to release end 128 of the guide member 126. Thereupon, a new guide member 126 may be inserted and attached in the manner already described.

While there has been shown and described what is considered at present to be the preferred embodiment of the invention, modifications thereto will readily occur to those skilled in the related arts. For example, in another structure the medium being inserted into the cassette could be inserted through an upper or side slot rather than a lower slot and/or the cross-sectional geometry of the cassette could be altered. It is believed that no further analysis or description of the invention is required and that the foregoing so fully reveals the gist of the present invention that those skilled in the applicable related arts can adapt it to meet the exigencies of their specific and particular requirements.

What is claimed is:

1. A cassette for receiving an elongated flexible medium and having:
   a. end walls and sides;
   b. a first opening means for providing access to the interior of said cassette;
   c. a second opening between said end wall for providing an admittance opening for said elongated flexible medium; and
   d. a pliable guide member disposed inside said cassette and having:
      (1) a low coefficient of friction, (2) a width not greater than the distance between said end walls, (3) a length of the order of the cross-sectional perimeter of said cassette, (4) one free end and, (5) having the other end attached to said cassette in the vicinity of said second opening for controlling and guiding the entry of said elongated flexible medium as it is admitted to said cassette through said second opening.

2. The combination as set forth in claim 1 and including drive means for incrementally inserting lengths of said elongated flexible medium into said cassette.

3. The combination as set forth in claim 2 and wherein said elongated flexible medium may comprise an undeveloped photographic medium and wherein said first and second openings are substantially lighttight.

4. The combination as set forth in claim 3 wherein said second opening is disposed near a lower edge of said cassette.

5. A cassette of the type into which a length of flexible medium is incrementally inserted through an appropriately positioned opening in said cassette, the combination with said cassette and said opening of a pliable guide member permanently affixed to said cassette at one end only and having a low coefficient of friction and a length approximately equal to the cross-sectional perimeter of said cassette and disposed within said cassette for guiding and directing the said flexible medium as it is collected in said cassette.

6. The combination as set forth in claim 5 and including a second opening for providing access to the interior of said cassette.

7. The combination as set forth in claim 6 wherein said first-named opening is disposed near a lower edge of said cassette.

8. The combination as set forth in claim 7 and wherein said flexible medium may comprise an undeveloped photographic medium and wherein said first-named opening and said second opening are substantially lighttight.

* * * * *